US008645715B2

(12) United States Patent
Dawson et al.

(10) Patent No.: US 8,645,715 B2
(45) Date of Patent: Feb. 4, 2014

(54) CONFIGURING HOST SETTINGS TO SPECIFY AN ENCRYPTION SETTING AND A KEY LABEL REFERENCING A KEY ENCRYPTION KEY TO USE TO ENCRYPT AN ENCRYPTION KEY PROVIDED TO A STORAGE DRIVE TO USE TO ENCRYPT DATA FROM THE HOST

(75) Inventors: Erika Marianna Dawson, Tucson, AZ (US); Richard Henry Guski, Red Hook, NY (US); Michael James Kelly, Staatsburg, NY (US); Cecelia Carranza Lewis, San Jose, CA (US); Jon Arthur Lynds, San Jose, CA (US); Wayne Erwin Rhoten, Morgan Hill, CA (US); Peter Grimm Sutton, La Grangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 11/853,719

(22) Filed: Sep. 11, 2007

(65) Prior Publication Data

US 2009/0067633 A1 Mar. 12, 2009

(51) Int. Cl.
G06F 11/30 (2006.01)
G06F 12/14 (2006.01)
H04L 9/00 (2006.01)
H04L 9/08 (2006.01)

(52) U.S. Cl.
USPC ........... 713/193; 713/189; 380/277; 380/278; 380/279

(58) Field of Classification Search
USPC .................. 713/189, 193; 380/277, 278, 279
See application file for complete search history.

(56) References Cited

U.S. PATENT DOCUMENTS

| 6,134,660 | A | 10/2000 | Boneh et al. | |
|---|---|---|---|---|
| 6,754,827 | B1 * | 6/2004 | Cane et al. | 713/193 |
| 6,826,665 | B1 * | 11/2004 | Nambu | 711/162 |
| 7,240,197 | B1 * | 7/2007 | Yamagami et al. | 713/168 |
| 7,568,124 | B2 * | 7/2009 | Ali et al. | 714/6.3 |

(Continued)

OTHER PUBLICATIONS

Dimmer, et al., "IBM System Storage TS1120 Tape Encryption with IBM System i", IBM Corp., Jun. 2007, pp. 1-41.

(Continued)

*Primary Examiner* — Taghi Arani
*Assistant Examiner* — Jahangir Kabir
(74) *Attorney, Agent, or Firm* — Konrad Raynes Davda & Victor LLP

(57) ABSTRACT

Provided are a method, system, and article of manufacture for configuring host settings to specify encryption and a key label referencing a key encrypting key to use to encrypt an encryption key provided to a storage drive to use to encrypt data from the host. User settings are received to configure a data class having data attributes with encryption settings. The data class is stored with the received user encryption settings. A job is received indicating a data set to store to a removable storage medium. A data class is determined having data class attributes matching data attributes of the data set indicated in the job. A determination is made from the determined data class whether to encrypt the data. The data set and a command to encrypt the data set are transmitted to a storage drive in response to determining that the determined data class indicates to encrypt the data, wherein the command to encrypt the data set causes the storage drive to encrypt the data sets written to the removable storage medium with an encryption key.

15 Claims, 5 Drawing Sheets

(56) References Cited

U.S. PATENT DOCUMENTS

| | | | |
|---|---|---|---|
| 2002/0065835 A1* | 5/2002 | Fujisaki | 707/200 |
| 2002/0144108 A1 | 10/2002 | Benantar | |
| 2005/0050055 A1 | 3/2005 | Chang et al. | |
| 2007/0195447 A1* | 8/2007 | Starr et al. | 360/72.1 |
| 2007/0198609 A1* | 8/2007 | Black et al. | 707/204 |
| 2007/0288536 A1* | 12/2007 | Sen et al. | 707/204 |
| 2008/0126813 A1* | 5/2008 | Kawakami | 713/193 |

OTHER PUBLICATIONS

U.S. Patent Application entitled "Recovering Remnant Encrypted Data on a Removable Storage Media", U.S. Appl. No. 11/530,021, filed Sep. 7, 2006, by inventors E.M. Dawson, P.M. Greco, G.A. Jaquette and J.M. Karp.

U.S. Patent Application entitled "Maintaining Keys Removed from a Keystore in an Inactive Key Repository", U.S. Appl. No. 11/683,947, filed Mar. 8, 2007, by inventors S.H. Chang and K.V. Ngo.

Davida, et al., "Database Encryption System with Subkeys", ACM Transactions on Database Systems, vol. 6, No. 2, Jun. 1981, pp. 312-328.

"z/VSE Administration, Chap. 16, Implementing Hardware-Based Tape Encryption", IBM Corp., Mar. 2007, pp. 493-500.

Mallett, "Considerations for Applying Disk Encyrptors to Environments Subject to Hostile Overrun", IEEE, 1991, pp. 218-222.

Riedel, et al., "Framework for Evaluating Storage System Security", USENIX Assoc., Proceedings of the Fast 2002 Conference on File and Storage Technologies, Jan. 2002, pp. 1-17.

Hasan, et al., "Toward a Threat Model for Storage Systems", ACM, Nov. 2005, pp. 94-102.

Mack, et al., "New Tape Measure", Network Computing, Nov. 2005, pp. 39-47.

"BrightStor Storage Newsletter", Version 06.05, May 2006, [online][retrieved Jul. 16, 2007] http://supportconnectw.ca.com/public/enews/BrightStor/brig051206.asp.

Haeusser, et al., "IBM System Storage TS1120 Tape Encryption: Planning, Implementation, and Usage Guide", IBM Corp., Dec. 2006, pp. 1-406.

"IBM Encryption Key Manager Component for the Java Platform: Introduction, Planning, and User's Guide", IBM Corp., Dec. 2006, pp. 1-193.

* cited by examiner

CONFIGURING HOST SETTINGS TO SPECIFY AN ENCRYPTION SETTING AND A KEY LABEL REFERENCING A KEY ENCRYPTION KEY TO USE TO ENCRYPT AN ENCRYPTION KEY PROVIDED TO A STORAGE DRIVE TO USE TO ENCRYPT DATA FROM THE HOST

BACKGROUND OF THE INVENTION

1. Field of the Invention

The present invention relates to a method, system, and article of manufacture for configuring host settings to specify encryption and a key label referencing a key encrypting key to use to encrypt an encryption key provided to a storage drive to use to encrypt data from the host

2. Description of the Related Art

A host system may transmit write requests of data to a storage device, such as a tape drive. A host system administrator may define data classes for the host system providing storage policies based on the attributes of data the host is writing to determine how that data will be stored. For instance, a data class policy may indicate an expiration policy for data having certain data attributes, an archive policy, and types of storage drives and storage media to use for data having the attributes of a data class.

A host system may write encrypted data to a storage device. A host application program, such as a backup program, running in the host may first encrypt the data at the host and then write the encrypted data to a removable storage medium, such as a tape medium. The data classes may determine the storage devices used to store application data.

SUMMARY

Provided are a method, system, and article of manufacture for configuring host settings to specify encryption and a key label referencing a key encrypting key to use to encrypt an encryption key provided to a storage drive to use to encrypt data from the host. User settings are received to configure a data class having data attributes with encryption settings. The data class is stored with the received user encryption settings. A job is received indicating a data set to store to a removable storage medium. A data class is determined having data class attributes matching data attributes of the data set indicated in the job. A determination is made from the determined data class whether to encrypt the data. The data set and a command to encrypt the data set are transmitted to a storage drive in response to determining that the determined data class indicates to encrypt the data, wherein the command to encrypt the data set causes the storage drive to encrypt the data sets written to the removable storage medium with an encryption key.

Further provided is a storage drive in communication with a host system and a key manager and configured to perform read and write operations with respect to a removable storage medium coupled to the storage drive. The system includes an interface is coupled to one removable storage medium and an encryption engine to encrypt and decrypt data written to the coupled removable storage medium. An Input/Output manager causes operations: receiving a write request from the host system having indicating to encrypt the data and a key label identifying a key encrypting key to use to encrypt an encryption key the storage drive uses to encrypt and decrypt data; sending a request to the key manager with the key label for an encryption key; receiving from the key manager the encryption key to use to encrypt the data from the host system; invoking the encryption engine to use the encryption key to encrypt the data from the host system written to the coupled removable storage medium.

DETAILED DESCRIPTION

Figure 1:
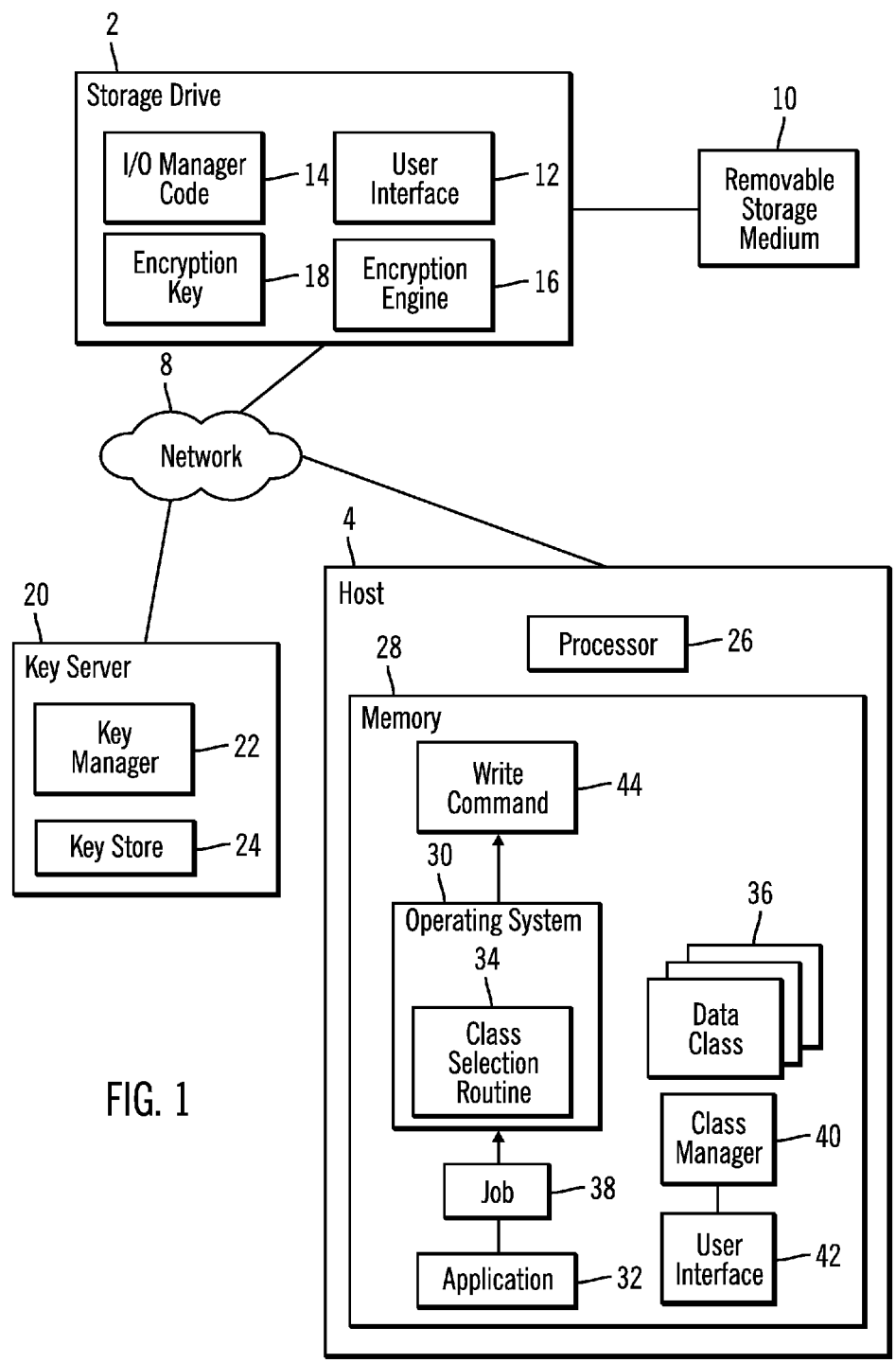
FIG. 1 illustrates an embodiment of a computing environment including a storage drive.

FIG. 1 illustrates an embodiment of a storage drive 2, a host 4, and a key server 20 that communicate over one or more networks 8. The storage drive 2 may comprise a removable storage drive for interfacing with a removable storage medium 10. The storage drive 2 may include a user interface 12 comprising one or more buttons or keys for interacting with the storage drive 2. The user interface 12 may include an eject button for manually unloading the removable medium; up/down buttons for navigating a list of items, enter/exit buttons for selecting items or exiting from a menu or list; one or more status displays, such as a light or LED (Light Emitting Diode), a numeric display, and alphanumeric display, etc.

The storage drive 2 includes Input/Output (I/O) manager code 14 to perform read/write operations with respect to the coupled removable storage medium 10 and an encryption engine 16. The removable storage medium 10 may comprise any type of media on which data may be stored and which may be removable, including but not limited to magnetic media (such as magnetic tape or disks), optical media (such as optical tape or disks), electronic media (such as PROM, EEPROM, flash PROM, MRAM, CompactFlash™, Smartmedia™, Memory Stick™, etc.), or other suitable media. In certain embodiments, the removable storage medium has a cartridge housing, such as the case with a magnetic tape cartridge or removable disk drive. The encryption engine 16 may use one or more encryption algorithms and an encryption key 18 to encrypt and decrypt data with respect to the coupled removable storage medium 10, which include, but are not limited to, DES (Data Encryption Standard), AES (Advanced Encryption Standard), RSA (Rivest Shamir Adleman), and other suitable encryption algorithms known in the art.

The key server 20 includes a key manager 22 and a key store 24. The key server 20 receives requests for encryption keys from the storage drive 2 and other components for keys the key manager 22 maintains in a key store 24, where the key store 24 comprises a database or other data structure storing keys (the key encrypting key (KEK) and/or encryption keys) that are used to encrypt data from various removable storage medium 10. The key store 24 may comprise a software element such as an array, structure, database, file, etc. In addition, a key store may comprise a hardware element such as memory, a hard drive, storage device, etc. The key server 20 may comprise a computer system and the key manager 22 a program executing in the key server 20.

The key manager 22 may receive an encrypted encryption key from the storage drive 2. In response, the key manager 22 may access the KEK from the key store 24 to use to decrypt the encrypted encryption key and then send the decrypted encryption key back to the storage drive 2 or other authorized component requesting the unencrypted encryption key. The encryption engine 16 of the storage drive 2 uses the received unencrypted encryption key to decrypt/encrypt data, and then discard the unencrypted data key after using the data key for a session or operation. The removable storage medium 10 may store active and previously used encrypted encryption keys and also key encrypting key (KEK) identifiers, also known as key labels, so that the storage drive 2 has to communicate with the remote key manager 22 to obtain an unencrypted encryption key that may be used by the encryption engine 16. The encrypted encryption key stored in the storage medium 10 may include a key label identifying and enabling access to the KEK used to encrypt and decrypt that key. For instance, the key label may identify a public/private key pair, where the public key is used to encrypt the encrypted key and the private key is used to decrypt the encrypted encryption key.

The key manager 22 may determine the KEK to use to encrypt and decrypt the encryption key 18 from the storage drive 2 from information provided by the host 4 or a KEK the key manager 22 maintains and uses. Further, when the storage drive 2 needs a key to use to encrypt/decrypt data to the coupled removable storage medium 10, the storage drive 2 requests a key from the key server 20. The key manager 22 would then generate the encryption key 18 for the storage drive 2 to use. The key manager 22 may send an encrypted encryption key to the storage drive 2 to use and store in the removable storage medium 10 to retrieve and use for later encryption and decryption. The key manager 22 may also send another encrypted data key to the storage drive 2 that the storage drive 2 is capable of decrypting. In an alternative embodiment, the key manager 22 may send a decrypted encryption key to the storage drive 2 to use.

The host 4 includes a processor 26 and a computer readable memory 28 in which various programs are loaded for the processor 26 to execute, such as an operating system 30 and application programs 32. The operating system 30 includes a class selection routine 34 to determine which data class 36 applies to data sets the application 32 sends as part of a job 38 to write to a removable storage medium 10. A data set comprises a file or other data object. The data classes 36 provide storage policies to apply to data, where each data class may specify a type of storage drive and removable storage media to use for data having specified attributes to use.

The data classes 36 may also provide recording technology information that the storage drive 2 uses to write the data to the storage media 10. Specification of a particular recording technology may indicate to the storage drive 2 that the data is to be encrypted.

A class manager 40 comprises a program that is used to generate and configure the data classes 36. The class manager 40 may render a user interface 42 to enable the user to configure the data class settings, including settings related to encryption operations the storage drive 2 will perform on data transferred as part of the job 38.

The operating system 30 generates a write command 44 including the data set to write, the encryption setting and optional key label determined by the class selection routine 34 applying a data class 36 for the data set to write to the storage drive 2.

FIG. 1 shows only one instance of a storage drive 2, host 4, key server 20, and network 8. However, there may be multiple storage drives 2 with which the host 4 may direct Input/Output (I/O) requests, multiple hosts 4 and multiple key servers 20. In one embodiment, the network 8 over which the host 4, storage drive 2 and key server 20 communicate may comprise a same network, such as shown in FIG. 1. Alternatively, the host 4 and storage drive 2 may communicate over a separate network from the network over which the storage drive 2 and key server 20 communicate, where the separate networks may comprise networks that are not-interconnected and/or that use different communication protocols. The host 4, storage drive 2, and key server 20 may utilize communication interfaces comprising serial, parallel, or optical interfaces such as Ethernet, RS-232, USB (Universal Serial Bus), serial or parallel ATA (AT Attachment), SCSI (Small Computers System Interface), SAS (Serial Attached SCSI), Fibre Channel, IEEE 1394 (FireWire or iLink), IEEE 1284 (parallel port), etc. In addition, the communication interface may comprise network or wireless interfaces such as Ethernet, CAN (Controller Area Network), 802.11 (Wi-Fi), X.25 (WAN), Bluetooth, etc.

Figure 2:
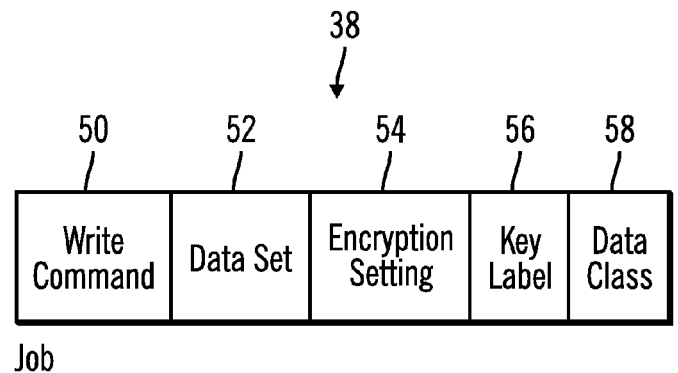
FIG. 2 illustrates an embodiment of information in a write job from an application to write data to a storage device.

FIG. 2 illustrates an embodiment of a job 38 generated and transmitted by an application 32 as including a write command 50 to write a data set 52 to a removable storage medium; an encryption setting 54 indicating whether to encrypt, not encrypt, or no encryption setting; an optional key label 56 identifying a KEK to use to encrypt the encryption key used to encrypt the data set 52; and an optional data class name 58 identifying a data class to use for storage and encryption settings. The job 38 may be created by the application program 32. In an alternative embodiment, the job 38 may indicate whether to encrypt not through a specific encryption setting 54, but instead by specifying a recording technology format that supports encryption in the specified data class 58.

Figure 3:
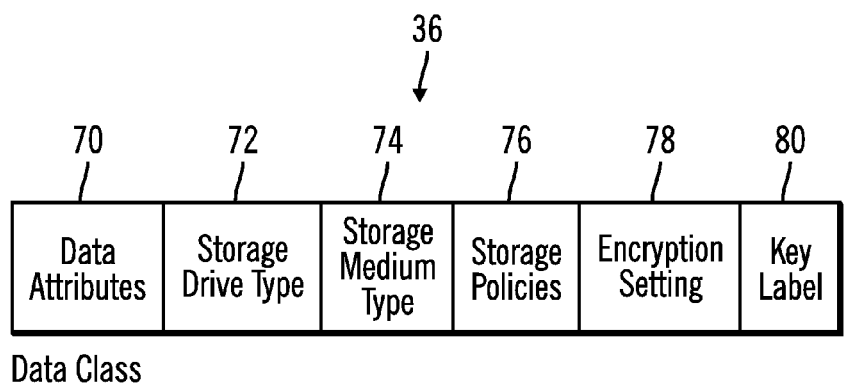
FIG. 3 illustrates an embodiment of information in a data class specifying data attributes and storage and encryption policies to use to write data having the attributes specified for the data class.

FIG. 3 illustrates an embodiment of information maintained for one of the data classes 36, including data attributes 70 of data to which the storage settings of the data class 36 apply; a storage drive type 72 indicating a type of storage drive 2 to use for the data having the data attributes 70, such as vendor, technical qualifications, etc.; a storage medium type 74 indicating a type of storage medium to use for the data having the attributes 70; storage policies 76 specifying storage operations to perform with respect to data having the data attributes 70, such as an expiration policy to delete data, archive data in an archival storage, migrate data to different storage types in a hierarchical storage management system, expiration policies for the storage medium used, etc.; an encryption setting 78 indicates whether to encrypt or not encrypt; and an optional key label 80 identifying a KEK for the key manager 22 to use to encrypt the encryption key 18 used to encrypt the data. In an alternative embodiment, the data class 36 may indicate whether to encrypt not through a specific encryption setting 78, but instead by specifying a recording technology format that supports encryption.

In one embodiment, the job 38 may comprise a file containing job control language (JCL) statements which direct the operation of the operating system 30 components in processing a job. In one embodiment, the JCL statements or job 38 may direct the class selection routine 34 on whether to perform encryption via the encryption setting 54 or specified recording format, may provide the key label 56, and may specify the data class 58 to apply. In another embodiment, the class selection routine 34 is coded to allow or not allow the encryption settings in the specified JCL statements or job 38 (which includes the encryption setting 54, key label 56 and data class 58) to override the encryption settings (which includes encryption setting 78, storage medium type (recording technology) 72 and key label 80) in the data class 36 that applies to the job 38 according to the data attributes 70.

Figure 4:
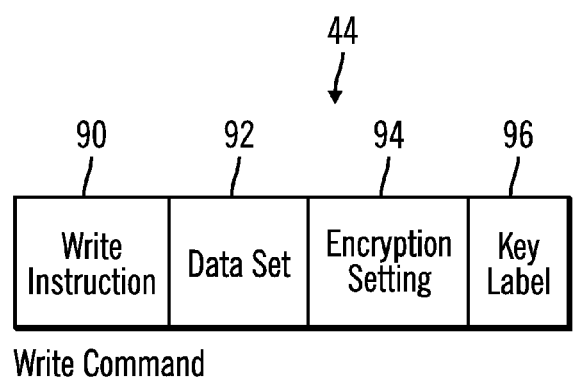
FIG. 4 illustrates an embodiment of information included in a write command transmitted to a storage drive.

FIG. 4 illustrates an embodiment of the write command 44 generated by the operating system 30 and class selection routine 34 as including a write instruction 90 that instructs the storage drive 2 that the request is a write request, the data set 92 to write, the encryption setting 94 and key label 96 determined by the class selection routine 34 based on the encryption settings specified in the data class 36 and job 38 for the data set. The embodiment of FIG. 4 shows a single write command 44. However, the information sent in the write command 44 may be sent in one or more commands or messages to the storage drive 2.

Figure 5:
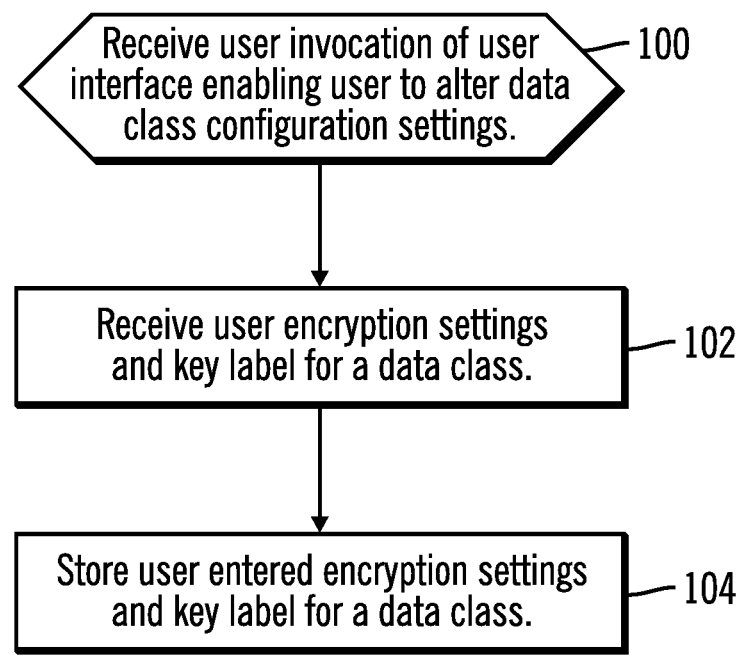
FIG. 5 illustrates an embodiment of operations for a user to configure encryption settings for a data class.

FIG. 5 illustrates an embodiment of operations implemented in the class manager 40 to enable a user to configure the encryption setting 76 and key label 78 for a data class 36 (FIG. 3). At block 100, the class manager 40 receives user invocation of the user interface 42 through which the user may alter data class 36 configuration settings, such as any of the fields 70-80 in FIG. 3. In response to receiving (at block 102) a user encryption setting 78 and/or a key label 80 for a data class 36, the class manager 40 stores (at block 104) user entered encryption setting 78 and the key label 80 for one data class 36.

Figure 6:
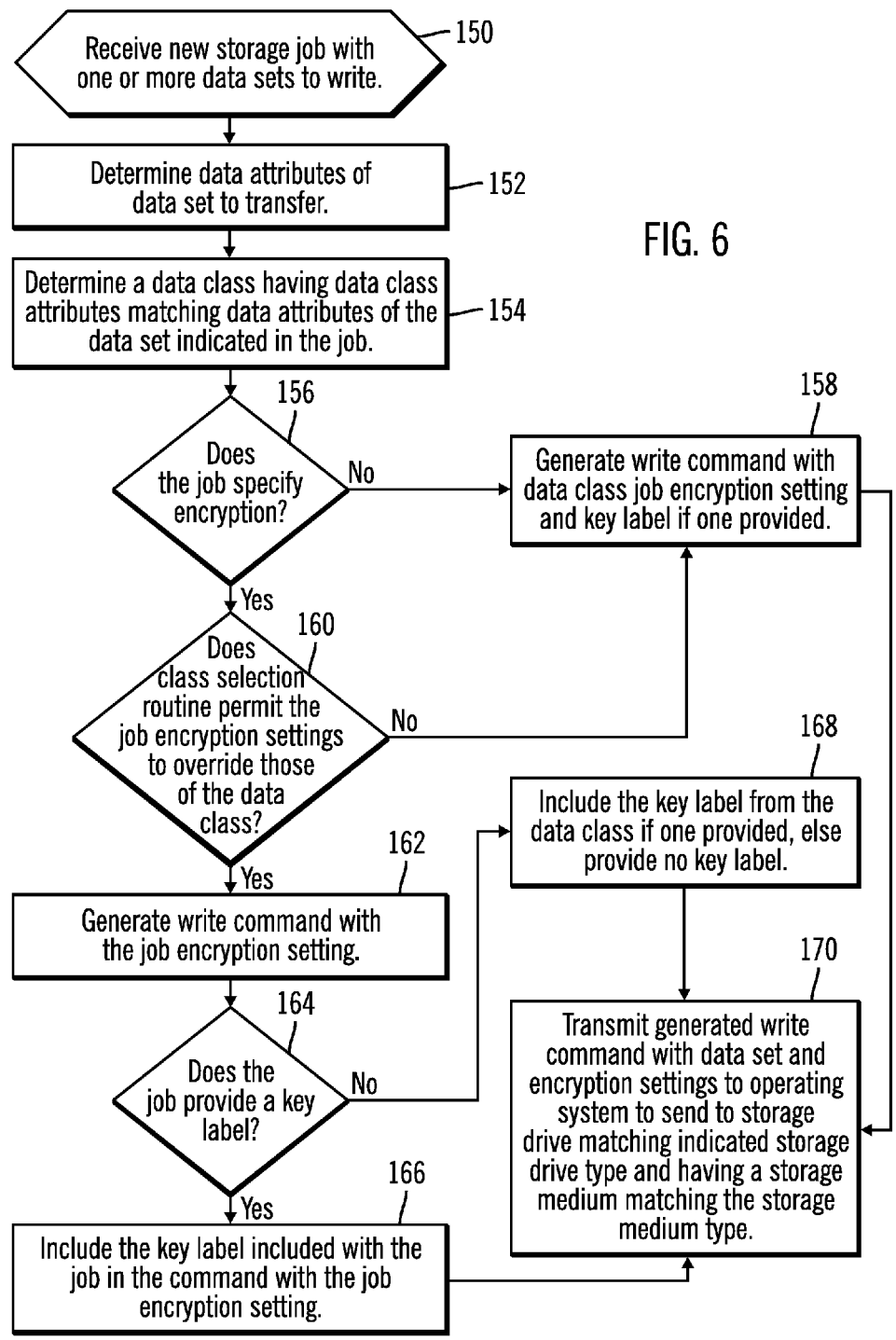
FIG. 6 illustrates an embodiment of operations to select encryption settings for a write command.

FIG. 6 illustrates an embodiment of operations performed by the class selection routine 34 to determine the encryption setting and key label to include in the write command 44 to transmit to the storage drive 2. Control begins at block 150 with the class selection routine 34 called from a job 38 from an application program 32. In one embodiment, the operating system 30 may receive the I/O or write requests from the applications 32 and then invoke the class selection routine 34 to process. In one embodiment, the job 38 may comprise a new tape request for a new file sequence to be transferred from the application 32 as part of a tape write operation, which may involve multiple data sets. The selection routine 34 determines (at block 152) data attributes of the data set to transfer. These attributes of the received data may include the user that created the data set, a user group that created the data set, an identifier or type of the application 32 that created the data set, a data type of the data in the data set; and a target storage specified for the data set. The selection routine 34 then determines (at block 154) a data class 36 having data class attributes 70 (FIG. 1) that match the determined data attributes of the data set indicated in the job 38. The attributes of the data set and data class 36 to consider for matching may comprise a user, user group (e.g., corporate department, service class of users (e.g., bronze, gold, etc.), etc.), application or application type, target storage, data type, data creation time, etc. If there is no matching data class 36, then a default data class may be used, which provides storage policies for data sets whose attributes do not fall within a particular user defined data class 36.

If (at block 156) the job 38 does not specify an encryption setting 54 (FIG. 2), then the class selection routine 34 generates (at block 158) a write command 44 with the data class job encryption setting 78 and the key label 80 if one is provided in fields 94 and 96 of the write command 44, respectively. As discussed, the job 38 and the data class 36 may specify encryption by specifying a recording format that supports encryption or by a flag or indicator 54 that specifies encryption. If the determined data class 36 specifies encryption, then the class selection routine 34 selects a storage drive 2 to use that supports the specified encryption format and codes the encryption setting 94 in the write command to instruct the storage drive 2 to write the data using the encryption recording format. If the determined data class 36 does not specify encryption, then the class selection routine 34 may select a storage drive 2 that does not support encryption or, if a storage drive 2 including an encryption engine 16 is selected, then instruct the storage drive 2 to use a non-encryption recording format. The class selection routine 34 may select one storage drive 2 of multiple storage drives to store the data that satisfies the storage drive type 72 and storage medium type 74 specified in the determined data class 36. If the write command 44 sent to the storage drive 2 does not specify a key label 96, then the key manager 22 may determine a KEK to use to encrypt the encryption key that the storage drive 2 will use to encrypt the data.

If (at block 156) the job 38 specifies encryption, then the class selection routine 34 determines (at block 160) whether the job 38 indication of whether to encrypt and the key label 56 are permitted to override the determined data class 36 encryption and key label settings. The class selection routine 34 may be coded to either permit the job 38 settings to override or not. If (at block 160) the job specified encryption settings may not override, then control proceeds to block 158 to generate the write command 44 to the storage drive 2 based on the policies and settings specified in the determined data class 36. Otherwise, if the job settings may override, then the class selection routine 34 generates (at block 162) the write command 44 with the job encryption setting 54 and a key label 56 included in fields 94 and 96, if provided. As discussed, in one embodiment, if the job encryption setting 54 specifies to encrypt, then the write command 44 generated by the operating system 30 (at block 162) selects a storage drive 2 to use that supports the specified encryption format and instruct the storage drive 2 to write the data using the encryption recording format. If the encryption setting 54 specifies to not encrypt the data, then the class selection routine 34 may select a storage drive 2 that does not support encryption or, if a storage drive 2 including an encryption engine 16 is selected, then instruct the storage drive 2 to use a non-encryption recording format. The class selection routine 34 may select one storage drive 2 of multiple storage drives to store the data that satisfies any storage drive type and storage medium type specified in, first, the job 38 or in the determined data class 36.

If (at block 164) the job 38 provides a key label 56, then the class selection routine 34 includes (at block 166) the key label 56 from the job 38 in field 96 of the write command 44. Otherwise, if the job 38 does not include a key label 56, then the class selection routine 34 includes (at block 168) the key label 80 from the determined data class 36 in field 96 of the write command 44 if the determined data class 36 provides a key label 80. If the write command 44 sent to the storage drive 2 has an encryption setting 94 requesting encryption but does not include a key label 96 from either the job 38 or the determined data class 36, then the key manager 22 may determine a KEK to use based on default settings to encrypt the encryption key that the storage drive 2 will use to encrypt the data.

After generating the write command 44 to instruct the storage drive 2 on encryption operations at blocks 158, 166, and 168, the class selection routine 34 may forward (at block 170) the generated command with the encryption setting and key label (if one is provided) to the operating system 30 to transmit to a selected storage drive 2 matching indicated storage drive type 72 and having a storage medium matching storage medium type 74. The operating system 30 may utilize a device driver for the storage drive 2 to transmit to the storage drive 2. Further, the host 4 may send further data sets to the storage drive 2 to which the command with the encryption setting was sent as part of a sequence of write commands. In such case, the storage drive 2 continues to write the subsequent data sets in the sequence using the encryption setting provided with the initial write command 44.

Figure 7:
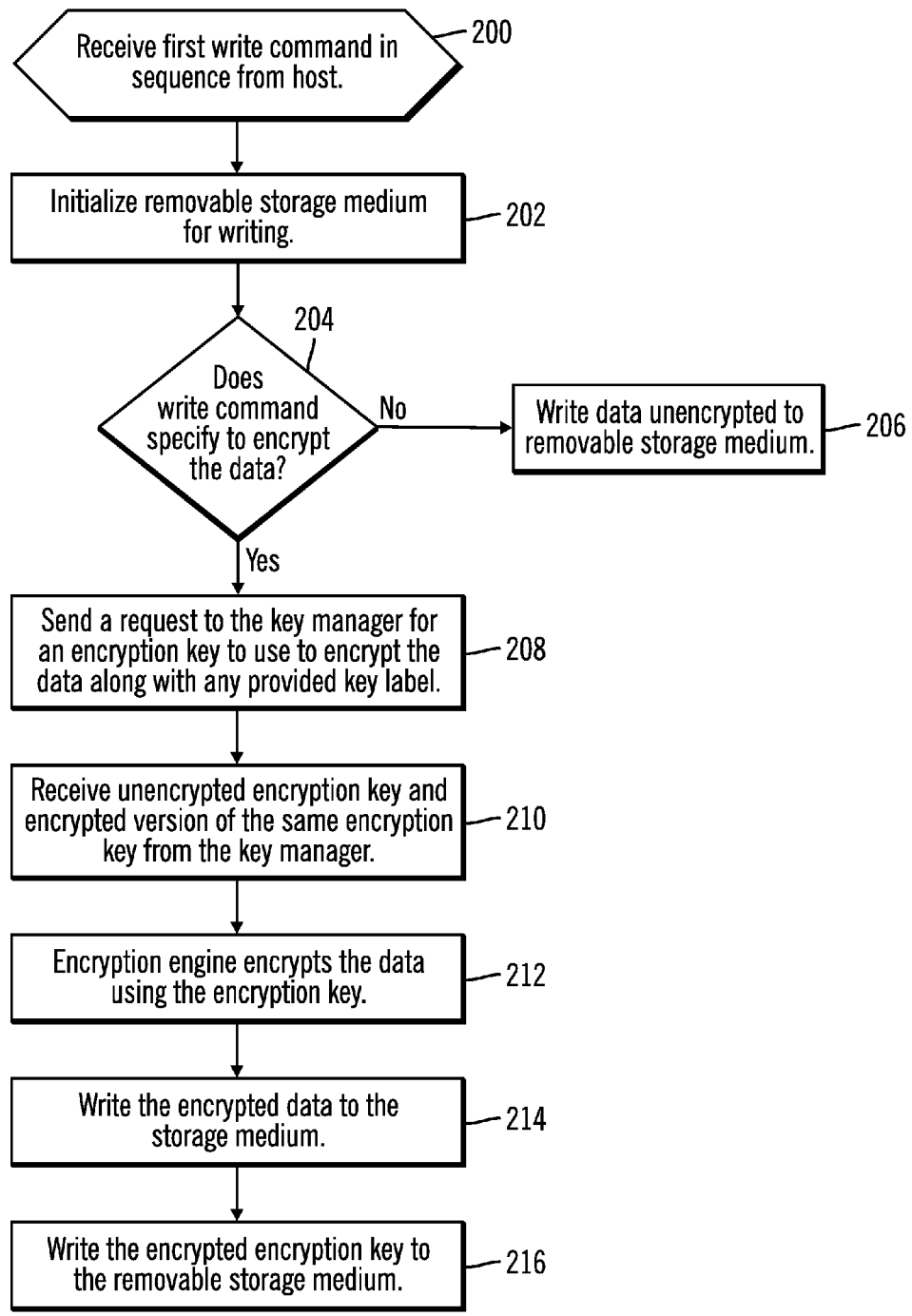
FIG. 7 illustrates an embodiment of operations performed by a storage drive to utilize encryption settings included with a write command to encrypt data written to a removable storage medium coupled to the storage drive.

FIG. 7 illustrates an embodiment of operations the storage drive I/O manager code 14 and encryption engine 16 perform to process the write command 44 with the encryption setting. Upon receiving (at block 200) the first write command 44 in a sequence, the I/O manager code initializes (at block 202) removable storage medium 10 for writing. In an embodiment, where the storage medium 10 comprises a tape medium, the tape may be loaded and initial markers written to the tape. If (at block 204) the write command 44 specifies to not encrypt data in the encryption setting 94, then the provided data set, and any following data set part of this initiated sequence, are written (at block 206) unencrypted to the removable storage medium 10. If (at block 204) the write command 44 specified to encrypt data in the encryption setting 94, then the I/O manager code 14 (or encryption engine 16) sends (at block 208) a request to the key manager 22 for an encryption key 18 to use to encrypt the data along with any provided key label 96.

In response to receiving the request for an encryption key, the key manager 22 may generate a new encryption key 18 or select a previously generated encryption key 18 and return the encryption key 18 to the storage drive 2, in unencrypted format. The key manager 22 may further forward to the storage drive 2 the encryption key 18 encrypted with a KEK, which may comprise the key referenced by the key label 96 provided in the write command 44 or a key determined by the key manager 22 if the storage drive 2 does not provide a key label. Upon receiving (at block 210) the unencrypted encryption key 18 and encrypted version of the same encryption key 18 from the key manager 22, the encryption engine 16 encrypts (at block 212) the data set 92 using the received encryption key 18 and then writes (at block 214) the encrypted data set to the removable storage medium 10. Further, the I/O manager code 14 or encryption engine 16 may write (at block 216) the encrypted encryption key 18 to the removable storage medium 10. If the tape drive 2 needs to decrypt data to return to a read request, then the tape drive 2 forwards the encrypted encryption key 18 to the key manager 22. The key manager 22 determines the KEK to use to decrypt the encrypted encryption key 18, which may be identified by a key label stored with the encryption key 18 or determined by the key manager 22 from an key index or file. The key manger 22 returns the decrypted encryption key 18 to the storage drive 2 to use to decrypt data stored in the removable storage medium 10.

Described embodiments enable an administrator of a host system to configure the encryption setting for a data class providing storage policy configurations for storage requests. The host may transmit a write request to a storage drive with an encryption setting indicating whether the storage drive should encrypt the transmitted data the storage drive writes to the removable storage medium. The host, according to the data class, may transmit a key label to the tape drive that the tape drive provides to a key manager to use to access a key, e.g., KEK, to use to encrypt the encryption key the storage drive uses to encrypt the data.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where one or more processors may read and execute the code from one or more computer readable media. A computer readable medium may comprise a medium such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, MRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission medium, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the key server 20 is remote to the storage drive 2. In an alternative embodiment, the key manager and key store may be implemented within code within the storage drive 2.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage device including code executed to communicate data to a removable storage medium coupled to a storage drive managing read and write access to the removable storage medium and to perform operations, the operations comprising:
receiving user settings to configure a data class data structure having data attributes with encryption settings;
storing the data class with the received user encryption settings;
receiving a job indicating a data set to store to the removable storage medium;
determining a data class data structure, from a plurality of data class data structures, having data class attributes matching data attributes of the data set indicated in the job, wherein the data attributes of the data set used to determine the data class data structure comprise at least one of an identity of the creator of the data in the data set, a data type of the data, and a user group of the data set, wherein the determined data class data structure includes an encryption setting indicating whether to encrypt the data and a key label identifying a key encrypting key used for encryption;
determining from the encryption settings in the determined data class data structure whether to encrypt the data;
transmitting the data set with a command to encrypt the data set to the storage drive in response to determining that the encryption settings of the determined data class data structure indicates to encrypt the data;
transmitting a key label indicated in one of the job and the data class structure to the storage drive, wherein the key label indicated in the data class structure is not transmitted if the key encrypting key indicated in the job is transmitted, wherein the key encrypting key indicated in the transmitted key label is used to encrypt an encryption key which the storage drive uses to encrypt the data set written to the removable storage medium, and wherein the command to encrypt the data set causes the storage drive to encrypt the data set transmitted with the command with the encryption key when writing the data set to the removable storage medium.

2. The article of manufacture of claim 1, wherein the job indicates whether to encrypt the data, and wherein the command indicating to encrypt the data set is transmitted in response to determining that the job indicates to encrypt the data set.

3. The article of manufacture of claim 1, wherein when the job indicates to encrypt the data set and indicates the key label identifying the key encrypting key, the operations further comprise:
determining whether the encryption indicated by the job may override the encryption indicated in the encryption settings of the determined data class data structure in response to determining that the job indicates whether to encrypt and the key label,
wherein the command to encrypt the data set and the key label specified in the data class data structure are transmitted in response to determining that the data class data structure indicates to encrypt the data set and that the encryption indicated by the job cannot override the encryption indicated by the data class data structure; and
wherein the command to encrypt the data set and the key label specified in the job are transmitted in response to determining that the job indicates to encrypt the data set and indicates the key label and the encryption indicated in the job is permitted to override the encryption indicated in the data class data structure.

4. The article of manufacture of claim 1, wherein the data class data structure is maintained by an operating system, wherein a utility of the operating system performs the operations of receiving the data set to write to the removable storage medium, determining the data class data structure for the data set and the encryption setting for the data class data structure, and transmitting the data set and command to encrypt to the storage drive.

5. The article of manufacture of claim 1, wherein the operations further comprise:
determining that the determined data class data structure indicates no encryption, wherein the data set is transmitted to the storage drive indicating to not encrypt, and wherein the storage drive writes the data set to the removable storage medium unencrypted in response to receiving the indication to not encrypt.

6. The article of manufacture of claim 1, wherein the data class data structure and data set attributes further include at least one of: an application that created the data set; and a target storage specified for the data set, and wherein the storage drive comprises a tape drive and the storage media comprises a tape media.

7. A system, comprising:
   a processor; and
   a computer readable storage device including programs executed by the processor, the programs comprising:
      a class manager executed to receive user settings to configure a data class having data attributes with encryption settings and store the data class with the received user encryption settings; and
      a class selection routine executed to:
         receive a job indicating a data set to store to a removable storage medium;
         determine a data class data structure, from a plurality of data class data structures, having data class attributes matching data attributes of the data set indicated in the job, wherein the data attributes of the data set used to determine the data class data structure comprise at least one of an identity of the creator of the data in the data set, a data type of the data, and a user group of the data set, wherein the determined data class data structure includes an encryption setting indicating whether to encrypt the data and a key label identifying a key encrypting key used for encryption;
         determine from the encryption settings in the determined data class data structure whether to encrypt the data;
         generate a write command to transmit the data set and a command to encrypt the data set to a storage drive in response to determining that the encryption settings of the determined data class data structure indicates to encrypt the data;
            transmitting a key label indicated in one of the job and the data class structure to the storage drive, wherein the key label indicated in the data class structure is not transmitted if the key encrypting key indicated in the job is transmitted, wherein the key encrypting key indicated in the transmitted key label is used to encrypt an encryption key which the storage drive uses to encrypt the data set written to the removable storage medium, wherein the command to encrypt the data set causes the storage drive to encrypt the data set transmitted with the command with the encryption key when writing the data set to the removable storage medium.

8. The system of claim 7, wherein when the job indicates to encrypt the data and indicates the key label identifying the key encrypting key, the class selection routine is further executed to:
   determine whether the encryption indicated by the job may override the encryption indicated in the encryption settings of the determined data class in response to determining that the job indicates whether to encrypt and the key label,
   wherein the command to encrypt the data set and the key label specified in the data class data structure are transmitted in response to determining that the data class data structure indicates to encrypt the data set and that the encryption indicated by the job cannot override the encryption indicated by the data class data structure; and
   wherein the command to encrypt the data set and the key label specified in the job are transmitted in response to determining that the job indicates to encrypt the data set and indicates the key label and the encryption indicated in the job is permitted to override the encryption indicated in the data class data structure.

9. The system of claim 7, further comprising:
   an operating system maintaining the data class data structure, and wherein the class selection routine is a utility of the operating system.

10. The system of claim 7, wherein the class selection routine is further executed to:
   determine that the determined data class data structure indicates no encryption, wherein the data set is transmitted to the storage drive indicating to not encrypt, and wherein the storage drive writes the data set to the removable storage medium unencrypted in response to receiving the indication to not encrypt.

11. A method, comprising:
   receiving user settings to configure a data class data structure having data attributes with encryption settings;
   storing the data class data structure with the received user encryption settings;
   receiving a job indicating a data set to store to a removable storage medium;
   determining a data class data structure, from a plurality of data class data structures, having data class attributes matching data attributes of the data set indicated in the job, wherein the data attributes of the data set used to determine the data class data structure comprise at least one of an identity of the creator of the data in the data set, a data type of the data, and a user group of the data set, wherein the determined data class data structure includes an encryption setting indicating whether to encrypt the data and a key label identifying a key encrypting key used for encryption;
   determining from the encryption settings in the determined data class data structure whether to encrypt the data set;
   transmitting the data set with a command to encrypt the data set to a storage drive in response to determining that the encryption settings of the determined data class data structure indicates to encrypt the data set; and
   transmitting a key label indicated in one of the job and the data class structure to the storage drive, wherein the key label indicated in the data class structure is not transmitted if the key encrypting key indicated in the job is transmitted, wherein the key encrypting key indicated in the transmitted key label is used to encrypt an encryption key which the storage drive uses to encrypt the data set written to the removable storage medium, wherein the command to encrypt the data set causes the storage drive to encrypt the data set transmitted with the command with the encryption key when writing the data set to the removable storage medium with an encryption key.

12. The method of claim 11, wherein when the job indicates to encrypt the data and indicates the key label identifying the key encrypting key, further comprising:
   determining whether the encryption indicated by the job may override the encryption indicated in the encryption settings of the determined data class in response to determining that the job indicates whether to encrypt and the key label,
   wherein the command to encrypt the data set and the key label specified in the data class data structure are transmitted in response to determining that the data class data structure indicates to encrypt the data set and that the encryption indicated by the job cannot override the encryption indicated by the data class data structure; and
   wherein the command to encrypt the data set and the key label specified in the job are transmitted in response to determining that the job indicates to encrypt the data set and indicates the key label and the encryption indicated in the job is permitted to override the encryption indicated in the data class data structure.

13. The method of claim 11, wherein the data class data structure is maintained by an operating system, wherein a utility of the operating system performs the operations of receiving the data set to write to the removable storage medium, determining the data class data structure for the data set and the encryption setting for the data class data structure, and transmitting the data set and command to encrypt to the storage drive.

14. The method of claim 11, further comprising:
    determining that the determined data class data structure indicates no encryption, wherein the data set is transmitted to the storage drive indicating to not encrypt, and wherein the storage drive writes the data set to the removable storage medium unencrypted in response to receiving the indication to not encrypt.

15. The article of manufacture of claim 1, further comprising:
    determining data attributes of the data set indicated in the job, wherein the determination of the matching data class data structure determines whether one user defined data class data structure has attributes matching the determined data attributes of the data set, wherein the attributes of the data class data structure comprise at least one of a user that created the data set, an application used to create the data set, and a data type of data in the data set; and
    using a default class as the determined data class data structure in response to determining that no user defined data class data structure has attributes matching data attributes of the data set.

* * * * *